Patented Mar. 11, 1941

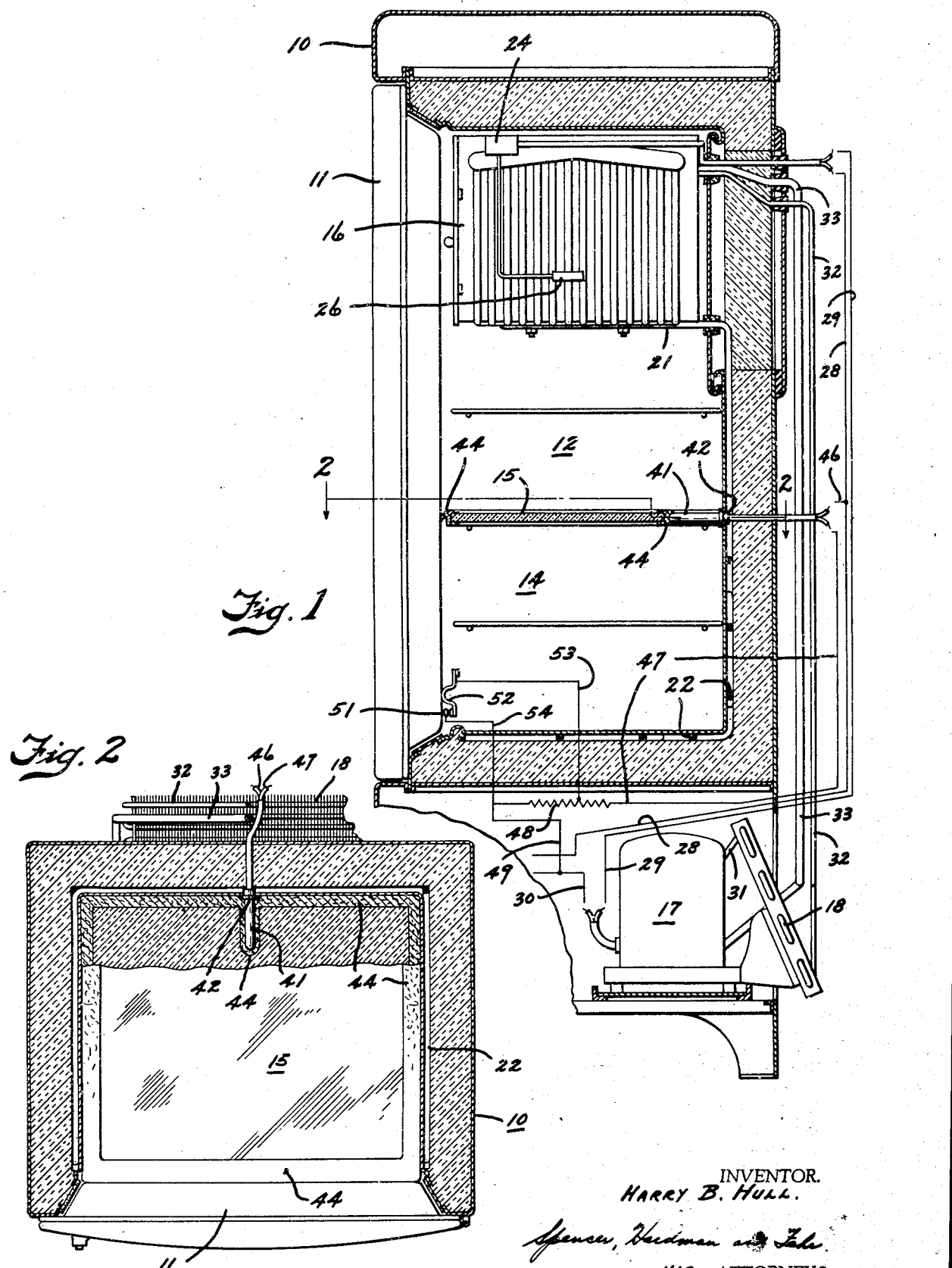

2,234,254

UNITED STATES PATENT OFFICE 2,234,254

REFRIGERATING APPARATUS

Harry B. Hull, Dayton, Ohio, assignor to General Motors Corporation, Dayton, Ohio, a corporation of Delaware Application June 22, 1939, Serial No. 280,601

11 Claims. (Cl. 62—89)

This invention relates to refrigeration and particularly to a refrigerating apparatus wherein foods stored in a refrigerated compartment thereof are treated.

An object of my invention is to provide an improved food storage apparatus in which the food products are treated and the air surrounding same is sterilized by beneficial light rays such as ultra-violet radiation while at the same time maintaining the foods at a low temperature.

Another object of my invention is to provide a single lamp for the interior of a food storage compartment of a refrigerating apparatus which will serve the double purpose of emitting beneficial light rays capable of treating foods in the compartment but normally of insufficient brilliancy for illuminating the compartment, which lamp can be rendered effective automatically for illuminating the interior of the food compartment.

A further object of my invention is to provide the food storage chamber of a refrigerating apparatus with a partition which divides the chamber into compartments to be maintained at different temperatures relative to one another and wherein an ultra-violet lamp utilized for accomplishing the results of the preceding objects cooperates with the partition to form a part thereof and to emit its rays into both compartments.

In carrying out the foregoing objects, it is a still further and more specific object of my invention to mount an ultra-violet lamp normally of low brilliancy in a food storage compartment of a refrigerating apparatus and to provide means associated with the apparatus for increasing the brilliancy of the lamp to illuminate the interior of the food compartment which means is rendered effective and ineffective automatically upon opening and closing the door affording access to the compartment.

Further objects and advantages of the present invention will be apparent from the following description, reference being had to the accompanying drawing, wherein a preferred form of the present invention is clearly shown.

In the drawing:

Fig. 1 is a vertical sectional view of a refrigerating apparatus having my invention embodied therein and showing the electrical circuits of the apparatus diagrammatically; and Fig. 2 is a horizontal sectional view through the cabinet of the apparatus taken on the line 2—2 of Fig. 1.

In the drawing I have shown a refrigerator cabinet and a refrigerating system therefor of the type disclosed in the copending application of Ralph K. Miller, Serial No. 224,786, filed August 13, 1938, for the purpose of illustrating the present invention. My invention is particularly applicable to the refrigerating apparatus shown in the copending application identified and reference thereto for constructional details may be had since I may herein only briefly describe the apparatus. In Fig. 1 of the drawing there is a refrigerating apparatus including a cabinet 10 having insulated walls enclosing a cooling chamber provided with an access opening which is normally closed by a door 11. The cooling chamber of cabinet 10 is divided into upper and lower food storage compartments 12 and 14 respectively by a partition 15 which is adapted to substantially isolate the compartments from air circulation therebetween. An evaporator 16 of a primary refrigerating system including a motor-compressor unit 17 and a condenser 18 is adapted to cool the upper food storage compartment. A secondary closed volatile refrigerant system has a refrigerant condensing portion 21 in thermal contact with evaporator 16 of the primary refrigerating system and is connected with a refrigerant evaporating portion 22 surrounding the wall of the food storage compartment 14 and disposed in intimate thermal contact therewith. In the operation of the apparatus disclosed, the motor-compressor 17 of the primary refrigerating system is controlled by a control switch 24 actuated in response to temperature changes of the evaporator 16 by a thermostat bulb 26. The switch 24 controls the flow of electric current to motor-compressor unit 17 through wires 28, 29 and 30 leading to a power supply main. Operation of motor-compressor 17 compresses refrigerant in the primary refrigerating system and forwards the compressed refrigerant under pressure through a pipe 31 to the condenser 18. The compressed refrigerant is cooled and liquefied in condenser 18 and is circulated through a pipe 32 and a suitable restrictor or expansion valve (not shown) to the evaporator 16. Refrigerant evaporates within evaporator 16 to remove heat from the upper food storage compartment 12 and the vaporized refrigerant is conveyed back to the motor-compressor unit 17 through a gaseous refrigerant pipe 33. Operation of the primary refrigerating system causes refrigerant sealed in the closed secondary refrigerating system to condense in the condenser portion 21 thereof and flow to the evaporating portion 22. The liquid refrigerant in the secondary refrigerating system removes heat from the food compartment 14 and in so doing evaporates and flows to the condenser 21 wherein it is again condensed and liquefied. In this manner, upper food storage compartment 12 is maintained at a lower temperature than the bottom compartment 14. The partition 15 serves to restrict air circulation between the food storage compartments 12 and 14 or to substantially close off the lower compartment 14 from evaporator 16 and consequently the air in compartment 14 is moist as compared to the air in the upper compartment 12. The primary evaporator 16 normally operates below freezing temperatures, say for example 20° F., in order to freeze water, placed in trays that are inserted into the evaporator, into ice cubes or blocks. This low average temperature of evaporator 16 tends to remove moisture from the air within compartment 12 and consequently reduces the air therein to a low relative humidity. By virtue of the partition 15 and due to the large amount of cooling surface 22 of the secondary refrigerating system provided for the lower compartment 14 with respect to its condensing portion 21, the secondary circuit may operate at a relatively higher temperature than the primary evaporator 16 to cool the compartment 14 to a temperature of between 35° and 45° F., and consequently this higher average temperature of compartment 14 maintains the air therein at a high relative humidity. The low temperature in compartment 12 causes moisture in the air therein to condense and accumulate in the form of frost or ice on the primary evaporator 16. Thus, the air in compartment 12 is substantially dry as in conventional refrigerators. The relatively higher temperature of the cooling surfaces of compartment 14 is above the point at which moisture will be withdrawn from the air in compartment 14 and consequently makes possible the maintenance of a high relative humidity in this higher temperature compartment. The parts of the apparatus thus far described and their function is substantially identical with the apparatus disclosed in the copending application above referred to.

Apparatuses of the type described are ordinarily provided with an illuminating lamp which is rendered effective by a switch operated by the door of the refrigerator cabinet which provides access to the food storage compartment. Such lamps are rendered effective upon opening the door to illuminate the interior of the cabinet for facilitating the withdrawal from the refrigerator of the particular foods desired to be removed by the user. My invention is directed specifically to the provision in refrigerating apparatuses of a lamp which will emit beneficial rays for treating foods stored therein and which is rendered effective, upon opening the refrigerator cabinet door, to serve as an illuminating lamp to thus eliminate the necessity of providing a separate or additional lamp for illuminating purposes. In the present disclosure I have shown an ultra-violet lamp 41 mounted in a receptacle 42 secured to the rear wall of the cooling chamber of cabinet 10. The ultra-violet lamp 41 is located on substantially the same horizontal plane with partition 15 and the partition 15 has a cutaway portion 43 (see Fig. 2) for receiving the lamp. Partition 15 is also provided about its peripheral edges with a resilient or flexible gasket 44 which seals against lamp 41, cabinet door 11 and walls of the cooling chamber to thereby isolate the food storage compartments 12 and 14 from air circulation therebetween. Thus, lamp 41 forms a part of the partition 15 and its location permits same to emit its rays into both compartments 12 and 14. The ultra-violet lamp 41 has a wire 46 extending from the receptacle 42 and connected to wire 28 of the electrical circuit for the refrigerating machine. Another wire 47 extends from the lamp 41 and its receptacle 42 and is connected to one end of a resistance element 48 having a wire 49 extending from its opposite end and connected to the wire 30 of the power circuit. Thus, the resistor element 48 is connected in series relation with wires 47 and 49 of the one power line leading to lamp 41. Lamp 41 is of low wattage, say for example one watt, by virtue of the use of the resistor 48 and is continuously effective during use of the refrigerating machine irrespective of whether or not the circuit to the motor-compressor unit 17 is open or closed. The ultra-violet lamp 41 is of a type and construction which can have its brilliancy increased from one watt to, say for example, 8 or 10 watts and I therefore provide means for increasing the wattage of the lamp. This means includes a switch preferably of a convention construction or type to be operated by movement of the refrigerator cabinet door and comprises a stationary contact 51 and a movable contact 52. Contact 52 is connected to the resistor 48 intermediate its ends by a wire 53 and contact 51 is connected by a wire 54 to wire 49 at one end of the resistor 48. That portion of the electric circuit for lamp 41 comprising the switch contacts 51 and 52 and wires 53 and 54 is thus connected in parallel circuit relation with the one power line leading to the lamp. Contact 52 is normally held by the cabinet door 11, when said door is in closed position, in spaced relation to contact 51 to render the entire resistance of the resistor element 48 effective to maintain or limit the electric current flowing to lamp 41 to one watt. Thus, as long as the cabinet door 11 is closed the lamp 41 is effective and emits beneficial rays such as ultra-violet radiation within the cooling chamber of cabinet 10. By virtue of locating the lamp 41 on the same horizontal plane with the partition 15, so that the lamp forms a part of this partition and is exposed to both compartments 12 and 14, the rays therefrom will be directed into both the upper and lower food storage compartments. Foods stored in the food compartments 12 and 14 will be treated by the radiation from lamp 41 during refrigeration thereof and the ultra-violet radiation, particularly the invisible rays thereof, causes the action of bacteria and the like to be arrested and kills or renders microörganisms dormant whereby the foods will be purified and properly preserved. In addition, the ultra-violet radiation sterilizes the air about the refrigerated foods and reduces odors in the food compartment to thereby prevent odors from being transferred from one variety of foods to others.

The ultra-violet lamp is a mercury vapor electric lamp and its glass enclosing bulb has a part of its interior surface coated with a suitable fluorescent material. For example, a powder mixture of zinc oxide, silicon dioxide and from .1 to .5% manganese which is placed in water and sprayed into the bulb and then permitted to dry is satisfactory for producing a fluorescent coating on the interior wall of the lamp bulb. The fluorescence of this coating on the bulb of the ultra-violet lamp causes the lamp, when its brilliancy is increased from 1 to 8 or 10 watts, to emit visible white-like rays of an illuminating nature. The visible or white-like rays obtained from the fluorescence of this coating on the bulb of ultra-violet lamp has been found to increase the illuminating effect of the lamp to a point equal to the illuminating effect obtained from an ordinary 20-watt light bulb. Thus, when the brilliancy of the ultra-violet lamp is increased from 1 to 8 or 10 watts, very little heat is generated within the food storage compartments and yet the visible white-like rays of the lamp is sufficient to light up the interior of the compartments with a brilliancy substantially equal to that obtained from an ordinary 20-watt light bulb. This fact plays an important part in the present invention in making possible the elimination of provision for an illuminating lamp in the refrigerator.

When the door 11 of cabinet 10 is opened the spring tension of contact 52, or any other suitable means for moving contact 52, in the door switch will cause this contact to move over against contact 51. Closing of contacts 51 and 52 shunts out a part of the resistor 48 and increases the flow of electric current to lamp 41 to thereby increase the wattage of the lamp and consequently the brilliancy thereof. The fluorescent coating on a part of the interior of the ultra-violet lamp bulb becomes effective under the increased wattage or current consumption of the lamp to thereby substantially double the brilliancy or illuminating character thereof to illuminate the interior of the food storage compartments 12 and 14. Contact 52 will move away from contact 51 upon closing of the cabinet door 11 and the entire resistance capacity of resistor 48 will again be rendered effective for limiting the flow of electric current to lamp 41 to thereby restrict the current consumption of the lamp to one watt and to continue treatment of the foods within the compartments 12 and 14 and air therein with ultra-violet radiation and particularly invisible ultra-violet rays. The low wattage of lamp 41 is sufficient to properly treat the foods and insures against overtreating same. Thus, I have provided a single lamp within a refrigerated chamber which treats foods therein and also serves as an illuminating lamp. By virtue of the location of the ultra-violet lamp as herein disclosed both food storage compartments on each side of the partition receive rays from the lamp and I thereby eliminate the necessity of providing a lamp for each compartment either for treating foods or for illuminating the compartments.

While the form of embodiment of the invention as herein disclosed, constitutes a preferred form, it is to be understood that other forms might be adopted, all coming within the scope of the claims which follow.

What is claimed is as follows:

1. A refrigerating apparatus comprising in combination, a cabinet having a food storage compartment therein, said compartment being provided with an access opening normally closed by a door, means for cooling said food storage compartment, an ultra-violet lamp associated with said cabinet and adapted to emit its rays into said compartment for treating foods stored therein and for sterilizing air within said compartment, an electric circuit for said lamp associated with said apparatus, means in series with said lamp circuit for limiting the flow of electric current to said lamp, means disposed in parallel circuit relation with said electric circuit and having a connection with a portion of said second named means for modifying the limiting effect thereof to increase the brilliancy of said lamp, said last named means being normally ineffective and rendered effective automatically by movement of said food compartment door, and said lamp having a fluorescent material on a part thereof for causing same to produce an illuminating effect within said compartment during the time the brilliancy of said lamp is increased.

2. A refrigerating apparatus comprising in combination, a cabinet having a chamber therein, said chamber being provided with an access opening normally closed by a door, a partition dividing said chamber into a plurality of food storage compartments, a lamp disposed in the same plane with said partition and forming a part thereof whereby said lamp emits its rays into both of said compartments, said partition having a gasket extending around the edges thereof and engaging said door, said lamp and walls of said chamber to substantially isolate said food storage compartments from air circulation therebetween, means for cooling one of said food storage compartments, and means for cooling the other of said food storage compartments, said last named means including a portion in intimate thermal contact with said first named means and another portion in heat exchange relation with the interior of said other compartment.

3. A refrigerating apparatus comprising in combination, a cabinet having a chamber therein, said chamber being provided with an access opening normally closed by a door, a partition dividing said chamber into upper and lower food storage compartments, a lamp disposed in the same horizontal plane with said partition and forming a part thereof whereby said lamp emits its rays into both the upper and lower food compartments, said partition having a gasket extending around the edges thereof and engaging said door, said lamp and walls of said chamber to substantially isolate said food storage compartments from air circulation therebetween, means for cooling the upper of said food storage compartments, and means for cooling the lower of said food storage compartments, said last named means including a portion in intimate thermal contact with said first named means and another portion in heat exchange relation with the interior of said lower compartment.

4. A refrigerating apparatus comprising in combination, a cabinet having a chamber therein, said chamber being provided with an access opening normally closed by a door, a partition dividing said chamber into a plurality of food storage compartments, a lamp disposed in the same plane with said partition and forming a part thereof whereby said lamp emits its rays into both of said compartments, said partition having a gasket extending around the edges thereof and engaging said door, said lamp and walls of said chamber to substantially isolate said food storage compartments from air circulation therebetween, means for cooling said food storage compartments, an electric circuit for said lamp associated with said apparatus, said electric circuit including means for limiting the flow of electric current to said lamp, said electric circuit also including means for modifying the limiting effect of said second named means, and said last named means being normally ineffective and rendered effective automatically by movement of said food compartment door.

5. A refrigerating apparatus comprising in combination, a cabinet having a chamber therein, said chamber being provided with an access opening normally closed by a door, a partition dividing said chamber into a plurality of food storage compartments, a lamp disposed in the same plane with said partition and forming a part thereof whereby said lamp emits its rays into both of said compartments, said partition having a gasket extending around the edges thereof and engaging said door, said lamp and walls of said chamber to substantially isolate said food storage compartments from air circulation therebetween, means for cooling said food storage compartments, an electric circuit for said lamp associated with said apparatus, said electric circuit including a resistance element which limits the flow of electric current to said lamp, said electric circuit also including a switch having a connection with said resistance element for rendering a part thereof ineffective to limit flow of electric current to said lamp, and said switch being normally ineffective and rendered effective automatically by movement of said food compartment door.

6. A refrigerating apparatus comprising in combination, a cabinet having a chamber therein, said chamber being provided with an access opening normally closed by a door, a partition dividing said chamber into upper and lower food storage compartments, an ultra-violet lamp disposed in the same horizontal plane with said partition and forming a part thereof whereby said lamp emits its rays into both the upper and lower food compartments for treating foods stored therein and for sterilizing air within said compartments, said partition having a gasket extending around the edges thereof and engaging said door, said lamp and walls of said chamber to substantially isolate said food storage compartments from air circulation therebetween, means for cooling said food storage compartments, an electric circuit for said lamp associated with said apparatus, means in series with said lamp circuit for limiting the flow of electric current to said lamp, means disposed in parallel circuit relation with said electric circuit and having a connection with a portion of said second named means for modifying the limiting effect thereof, and said last named means being normally ineffective and rendered effective automatically by movement of said food compartment door.

7. A refrigerating apparatus comprising in combination, a cabinet having a food storage compartment therein, said compartment being provided with an access opening normally closed by a door, means for cooling said food storage compartment, a lamp associated with said cabinet and adapted to emit its rays into said compartment, an electric circuit for said lamp associated with said apparatus, said electric circuit including means for limiting the flow of electric current to said lamp, said electric circuit also including means for modifying the limiting effect of said second named means, said last named means being normally ineffective and rendered effective automatically by movement of said food compartment door, and said lamp being of a type capable of emitting ultra-violet rays during effectiveness of said limiting means and of illuminating the food compartment when said modifying means is rendered effective.

8. A refrigerating apparatus comprising in combination, a cabinet having a food storage compartment therein, said compartment being provided with an access opening normally closed by a door, means for cooling said food storage compartment, a lamp associated with said cabinet and adapted to emit its rays into said compartment, an electric circuit for said lamp associated with said apparatus, said electric circuit including a resistance element which limits the flow of electric current to said lamp, said electric circuit also including a switch having a connection with said resistance element for rendering a part thereof ineffective to limit flow of electric current to said lamp, said switch being normally ineffective and rendered effective automatically by movement of said food compartment door, and said lamp being of a type capable of emitting ultra-violet rays during effectiveness of the resistance element and of illuminating the food compartment when said switch is rendered effective to render a part of said resistance element ineffective.

9. A refrigerating apparatus comprising in combination, a cabinet having a food storage compartment therein, said compartment being provided with an access opening normally closed by a door, means for cooling said food storage compartment, a lamp associated with said cabinet and adapted to emit its rays into said compartment, an electric circuit for said lamps associated with said apparatus, means in series with said lamp circuit for limiting the flow of electric current to said lamp, means disposed in parallel circuit relation with said electric circuit and having a connection with a portion of said second named means for modifying the limiting effect thereof, said last named means being normally ineffective and rendered effective automatically by movement of said food compartment door, and said lamp being of a type capable of emitting ultra-violet rays during effectiveness of said limiting means for treating foods stored in said compartment for sterilizing air therein and of illuminating the food compartment when said modifying means is rendered effective.

10. A refrigerating apparatus comprising in combination, a cabinet having a chamber therein, said chamber being provided with an access opening normally closed by a door, a partition cooperating with walls of the chamber and with said door for dividing said chamber into a plurality of food storage compartments, means for cooling said compartments to different temperatures relative to one another, and a lamp disposed in the same plane with said partition and forming a part thereof whereby said lamp emits its rays into both of said compartments.

11. A refrigerating apparatus comprising in combination, a cabinet having a plurality of walls forming a chamber therein, said chamber being provided with an access opening normally closed by a door, a partition cooperating with the walls of said chamber and with the inner face of said door dividing the chamber into a plurality of food storage compartments, said partition having an opening therein, a lamp disposed in said chamber, at least a portion of said lamp being disposed in the plane of said partition and received in the opening therein whereby the lamp forms a part of said partition and emits its rays into the food storage compartments on each side thereof, and means for cooling said plurality of food compartments.

HARRY B. HULL.